(12) United States Patent
Danzer et al.

(10) Patent No.: US 6,278,741 B1
(45) Date of Patent: Aug. 21, 2001

(54) TIMING RECOVERY CIRCUIT IN QAM MODEMS

(75) Inventors: Byron Esten Danzer, Aptos; Richard William Koralek, Palo Alto; David Bruce Isaksen, Mountain View, all of CA (US)

(73) Assignee: Wideband Computers, Inc., Mountain View, CA (US)

( * ) Notice: Subject to any disclaimer, the term of this patent is extended or adjusted under 35 U.S.C. 154(b) by 0 days.

(21) Appl. No.: 09/425,518

(22) Filed: Oct. 22, 1999

(51) Int. Cl.[7] ................................ H04L 5/12; H04L 5/16
(52) U.S. Cl. .............................. 375/261; 375/222
(58) Field of Search ................... 375/261, 222, 375/219, 355, 371, 373, 376

(56) References Cited

U.S. PATENT DOCUMENTS

| | | | |
|---|---|---|---|
| 4,953,117 | * | 8/1990 | Lagadec .................... 708/313 |
| 5,200,981 | * | 4/1993 | Carmon .................... 375/355 |
| 6,101,230 | * | 8/2000 | Chun et al. .............. 375/355 |

* cited by examiner

*Primary Examiner*—Chi Pham
*Assistant Examiner*—Khai Tran
(74) *Attorney, Agent, or Firm*—Boris G. Tankhilevich

(57) ABSTRACT

A timing recovery system and method for QAM signals having different symbol rates are disclosed. After sampling the QAM baseband signal, a symbol timing recovery logic including a generator of a weighting function is utilized to develop a local error signal. The local error signal averaged over a predetermined time period is utilized to make a global decision regarding the sampling point position relative to the baseband signal maximum/minimum.

11 Claims, 15 Drawing Sheets

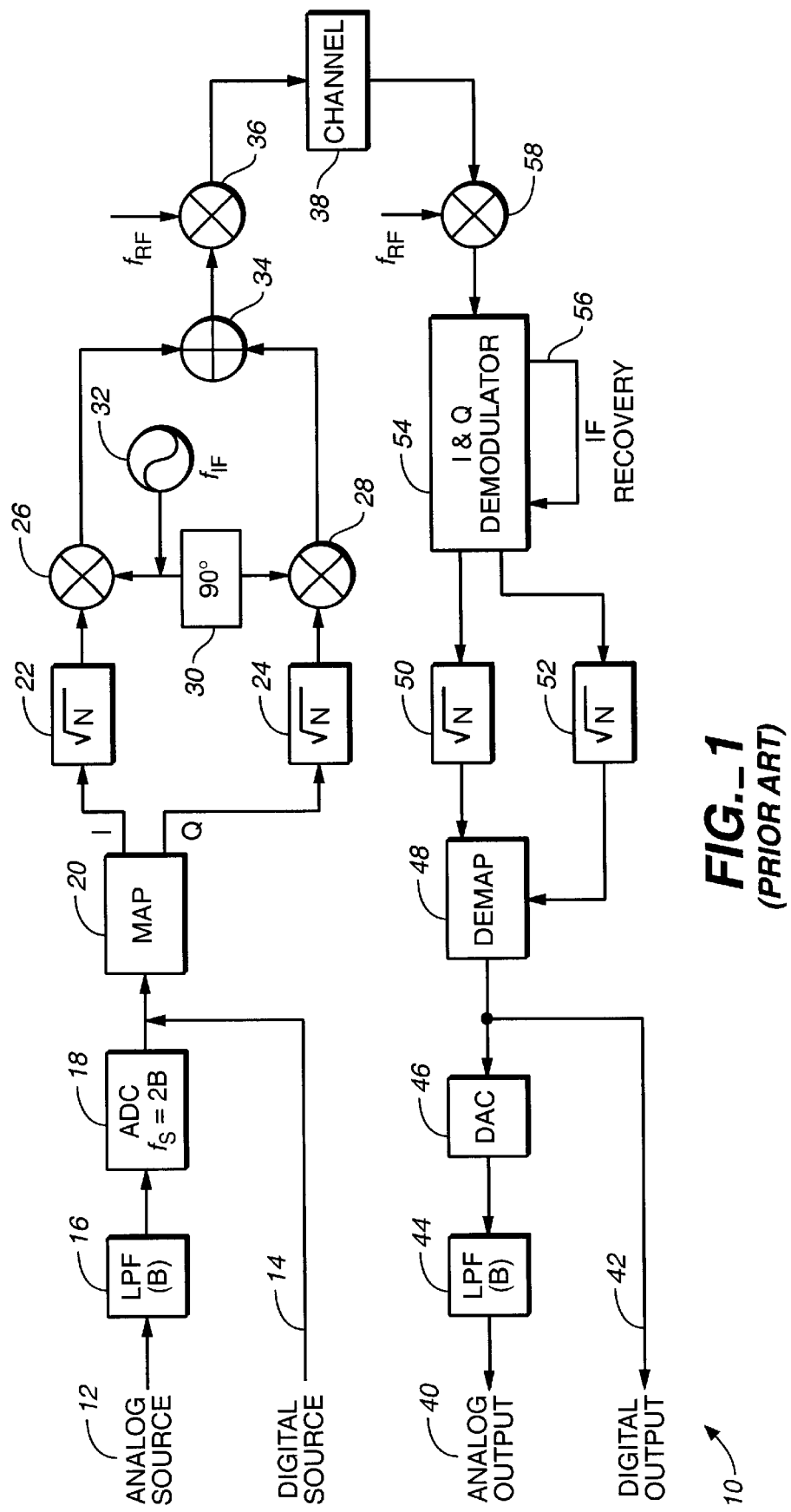
FIG._1 (PRIOR ART)

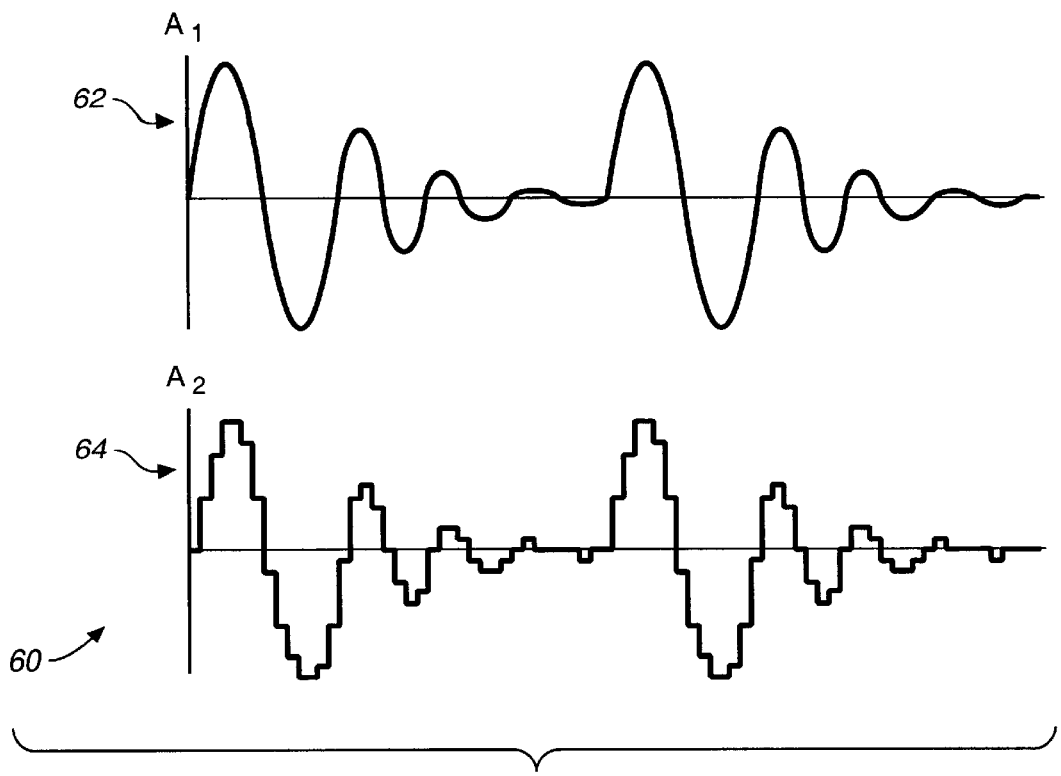
FIG._2 (PRIOR ART)
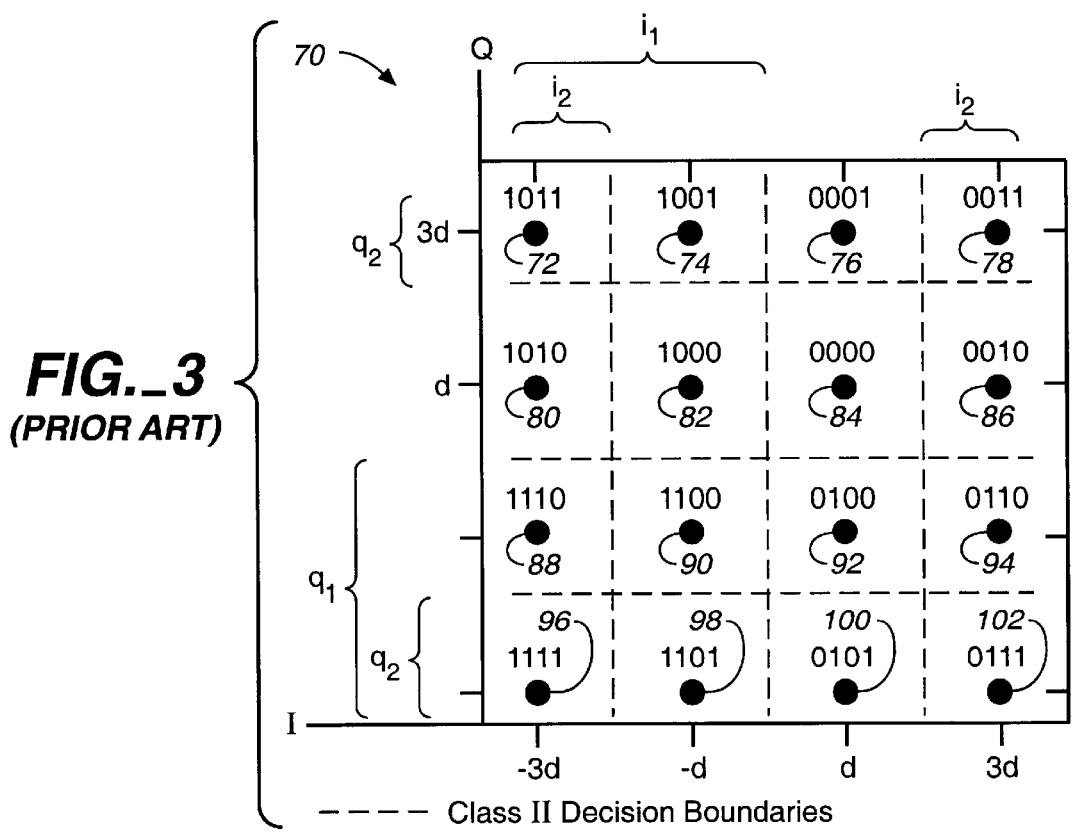
FIG._3 (PRIOR ART)

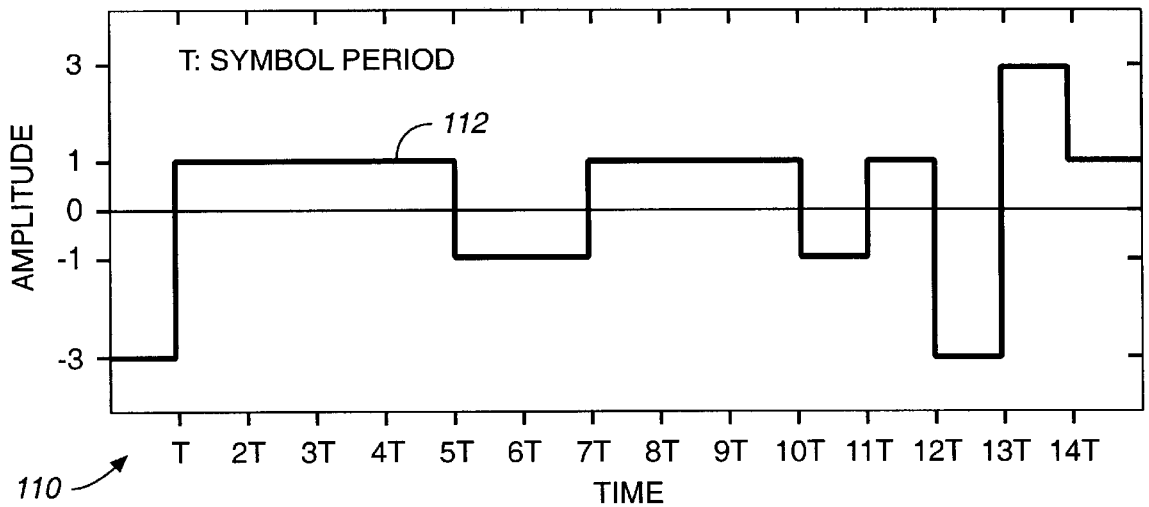
FIG._4 (PRIOR ART)
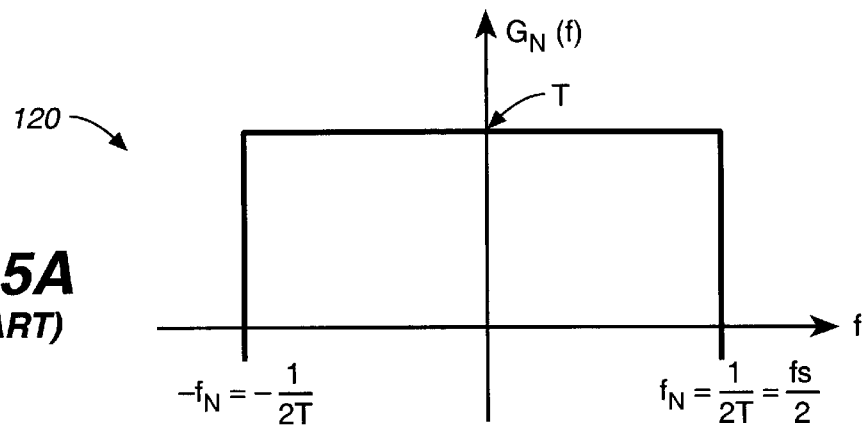
FIG._5A (PRIOR ART)
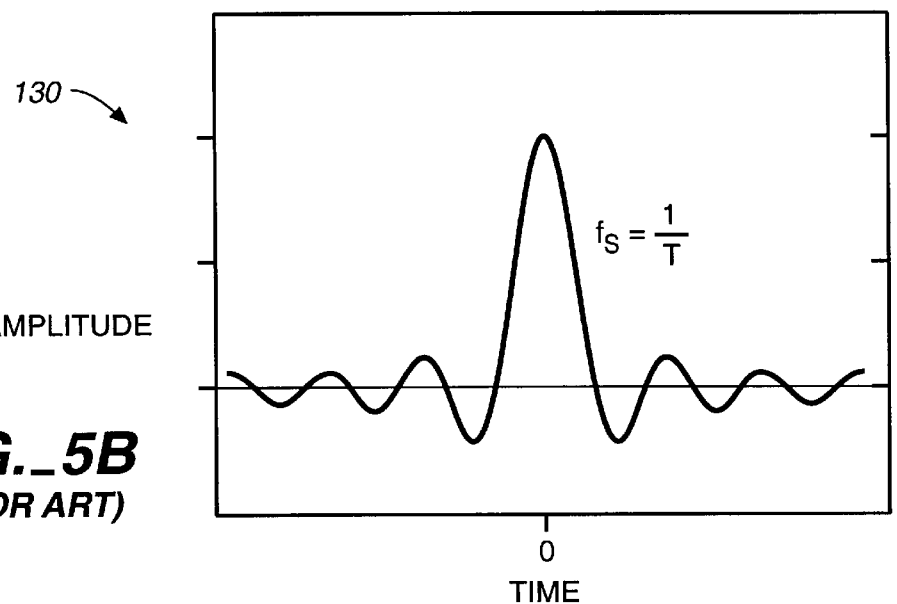
FIG._5B (PRIOR ART)

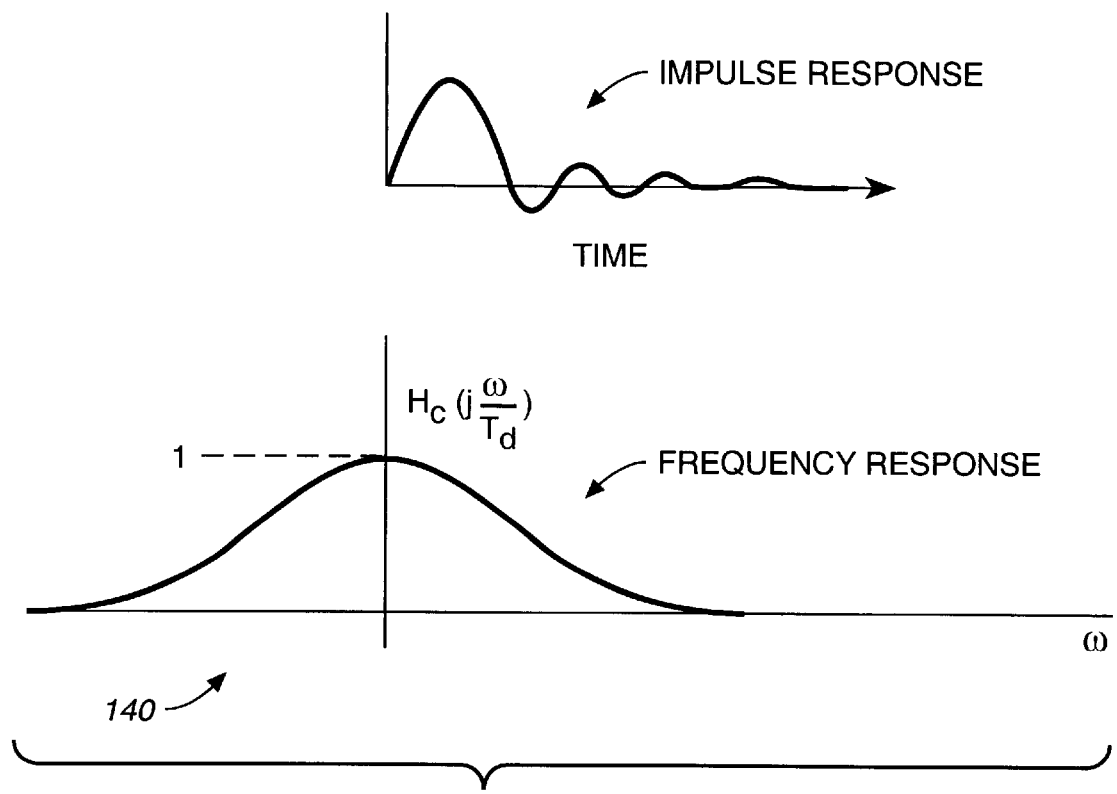
FIG._6A
*(PRIOR ART)*
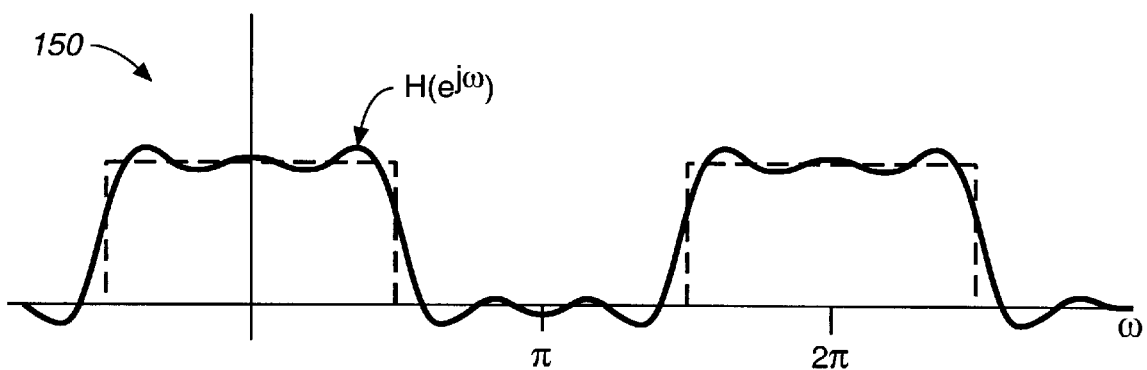
FIG._6B
*(PRIOR ART)*

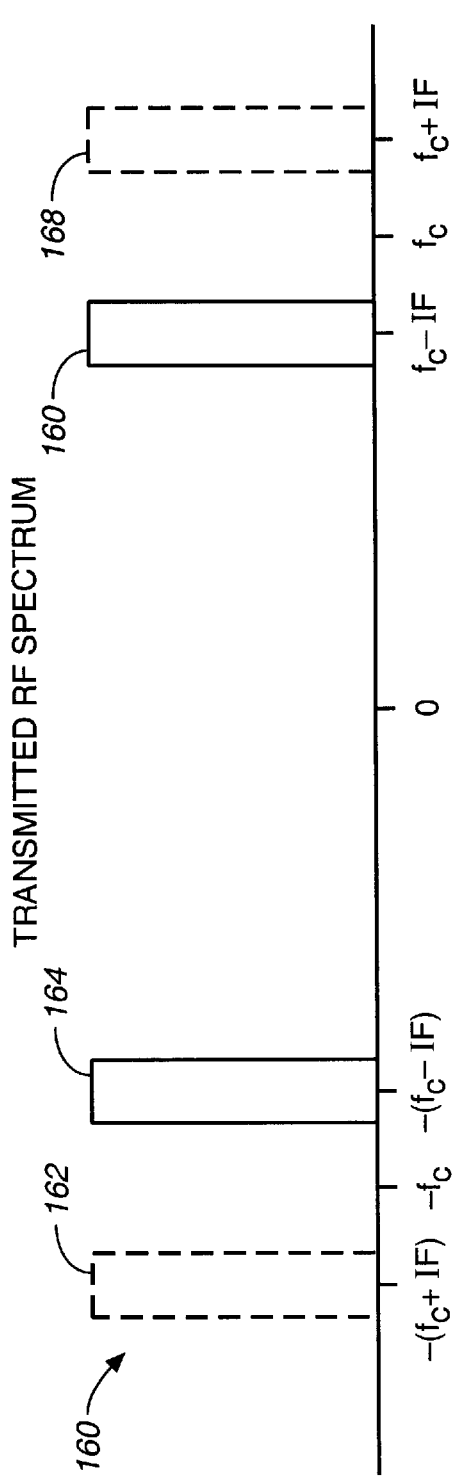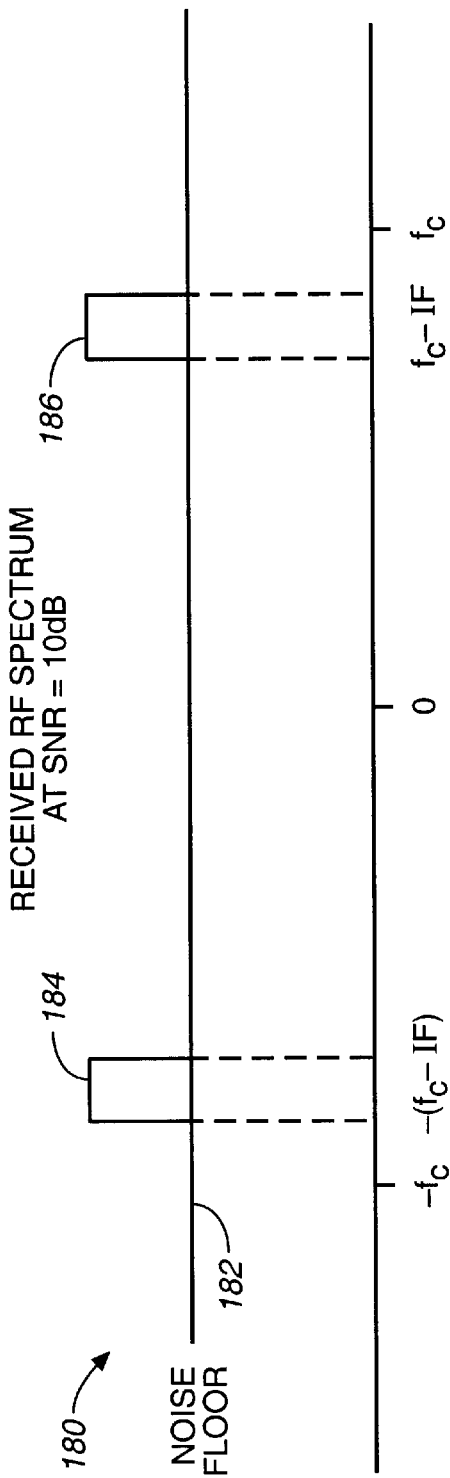

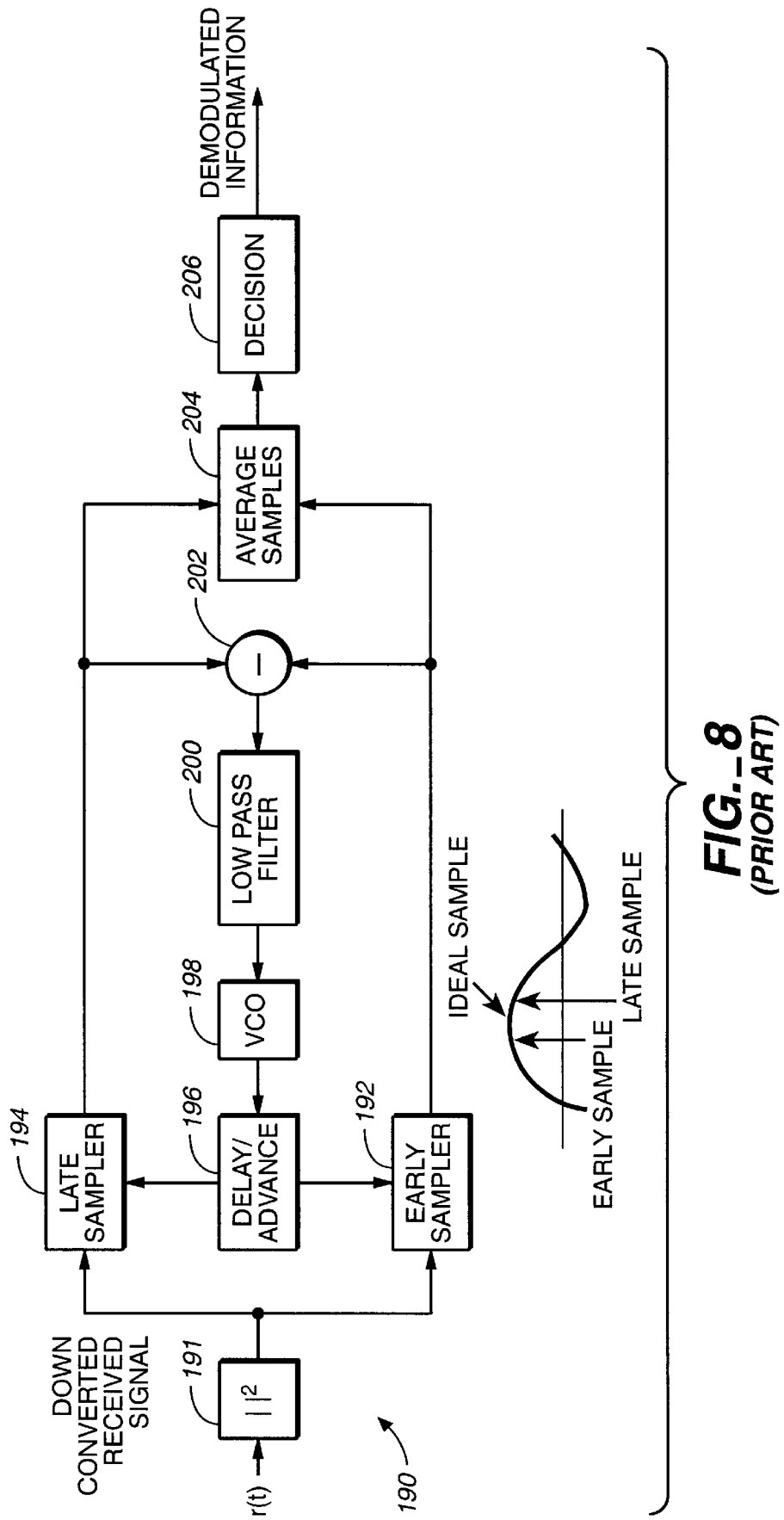
FIG._8
(PRIOR ART)

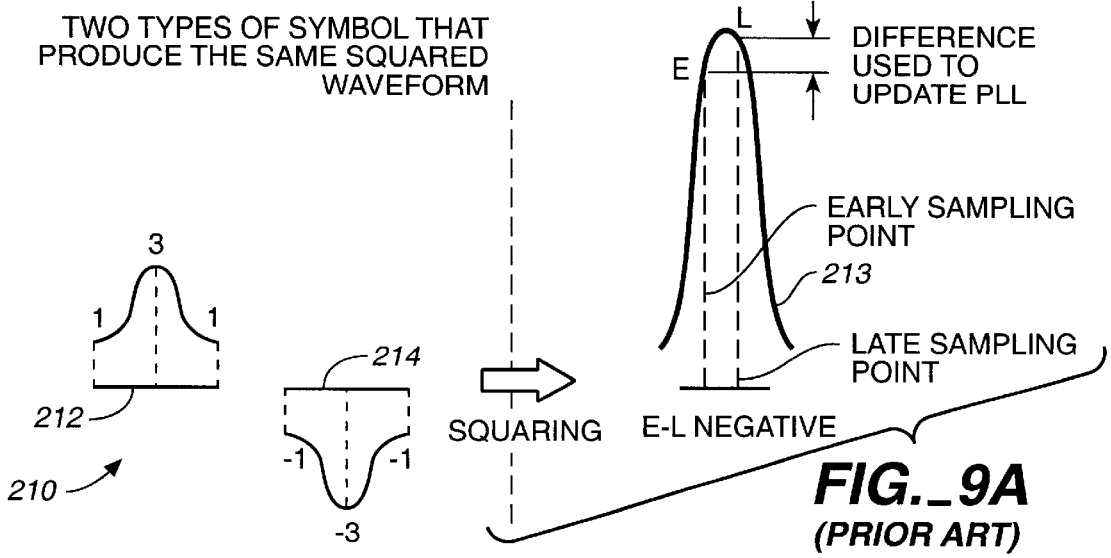
FIG._9A (PRIOR ART)
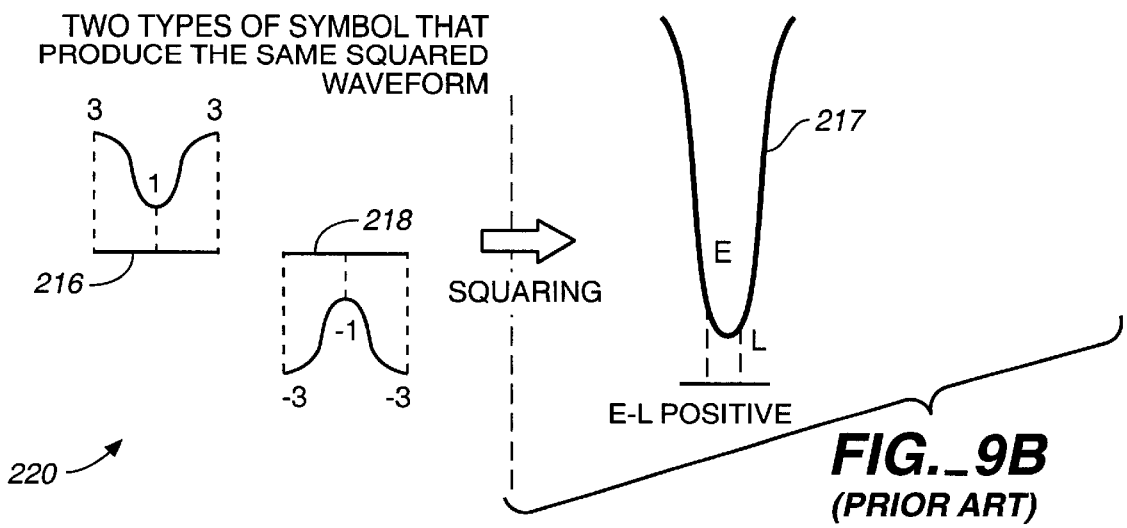
FIG._9B (PRIOR ART)
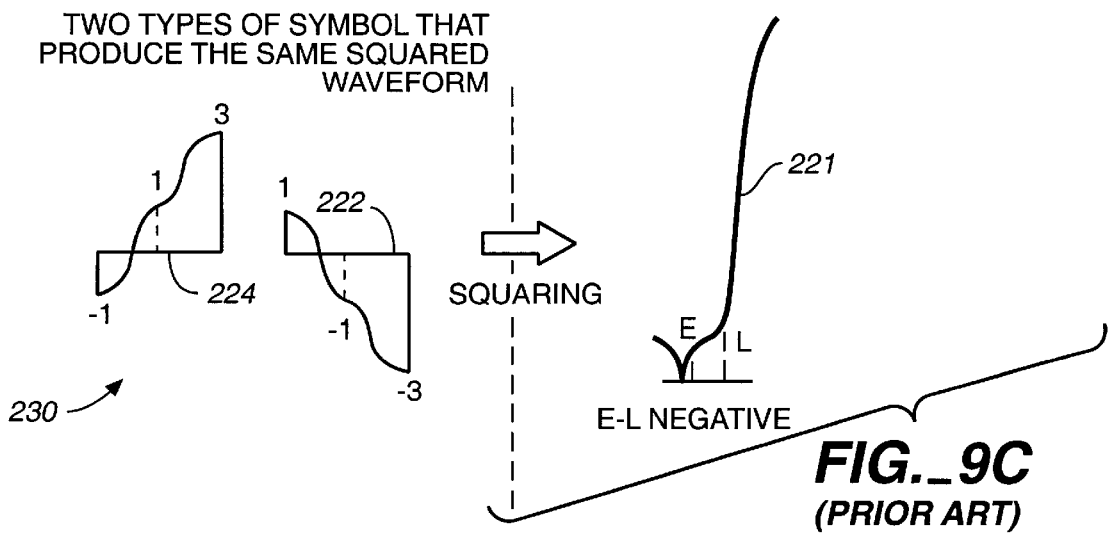
FIG._9C (PRIOR ART)

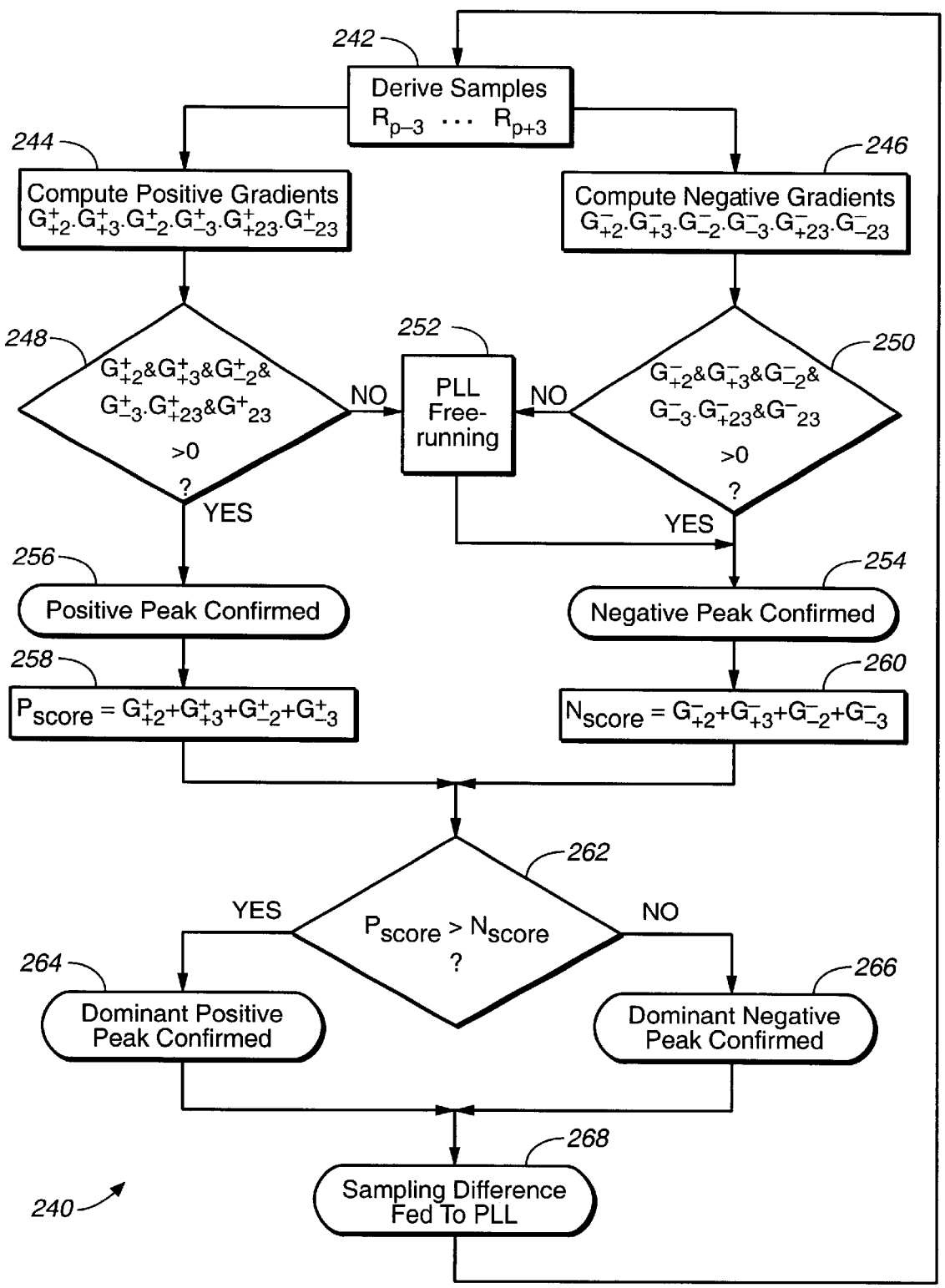
*FIG._10*
*(PRIOR ART)*

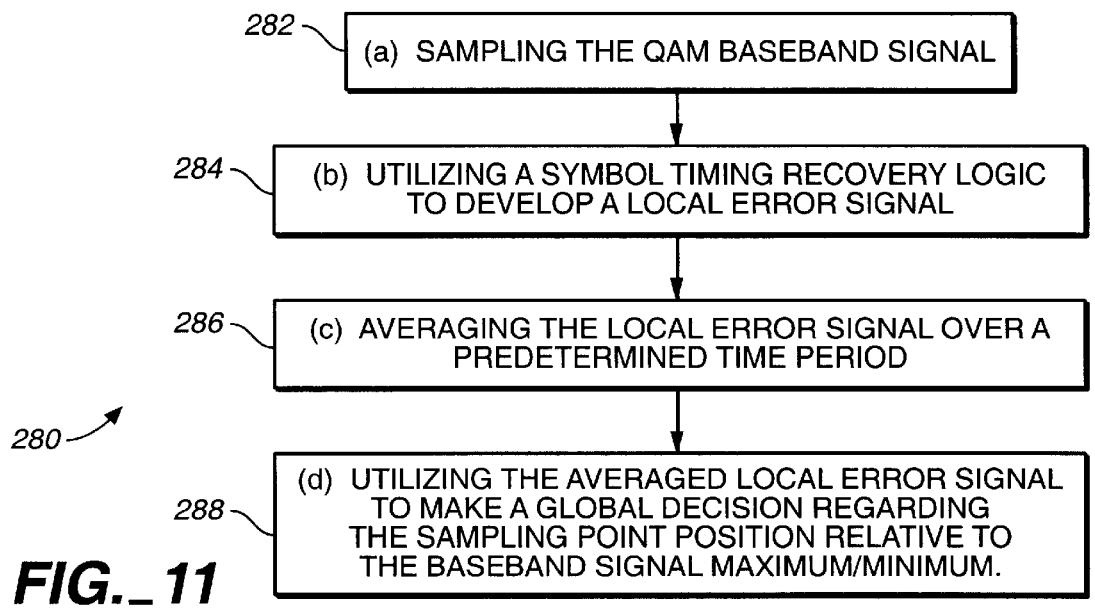
FIG._11
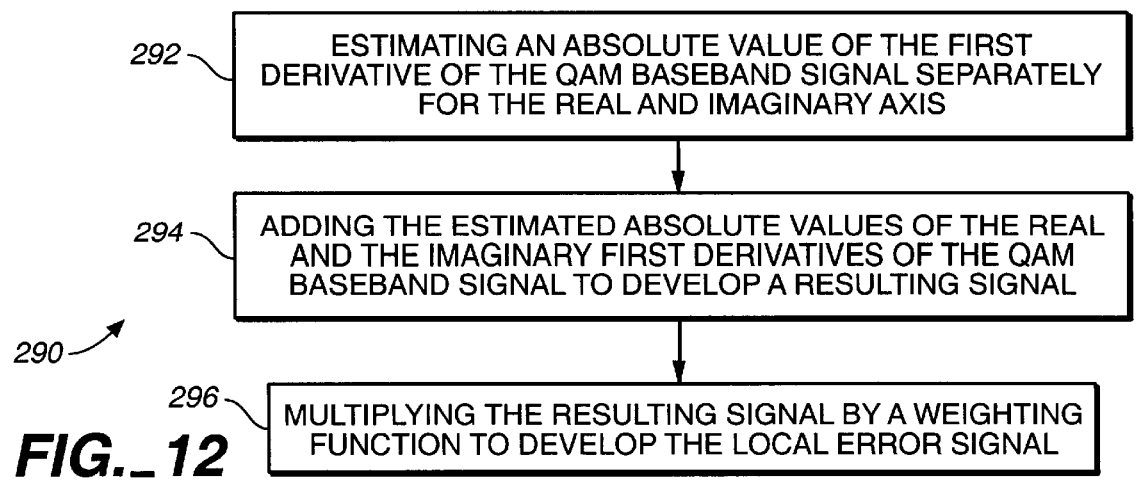
FIG._12
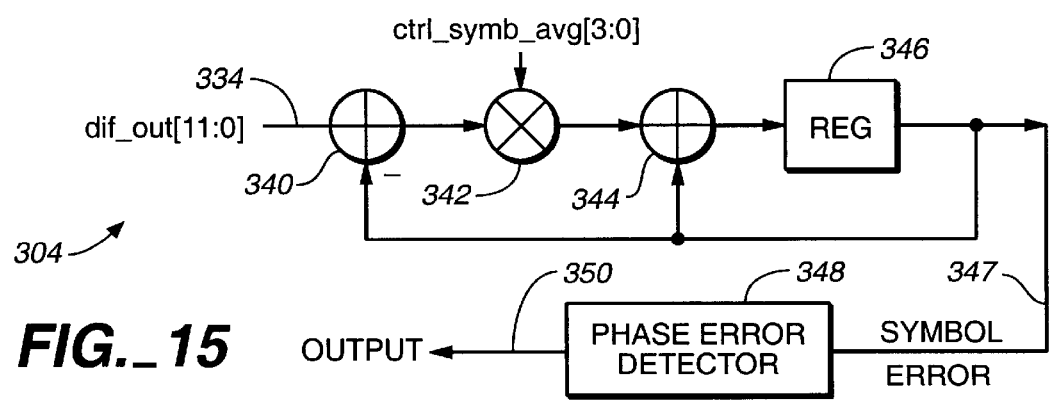
FIG._15

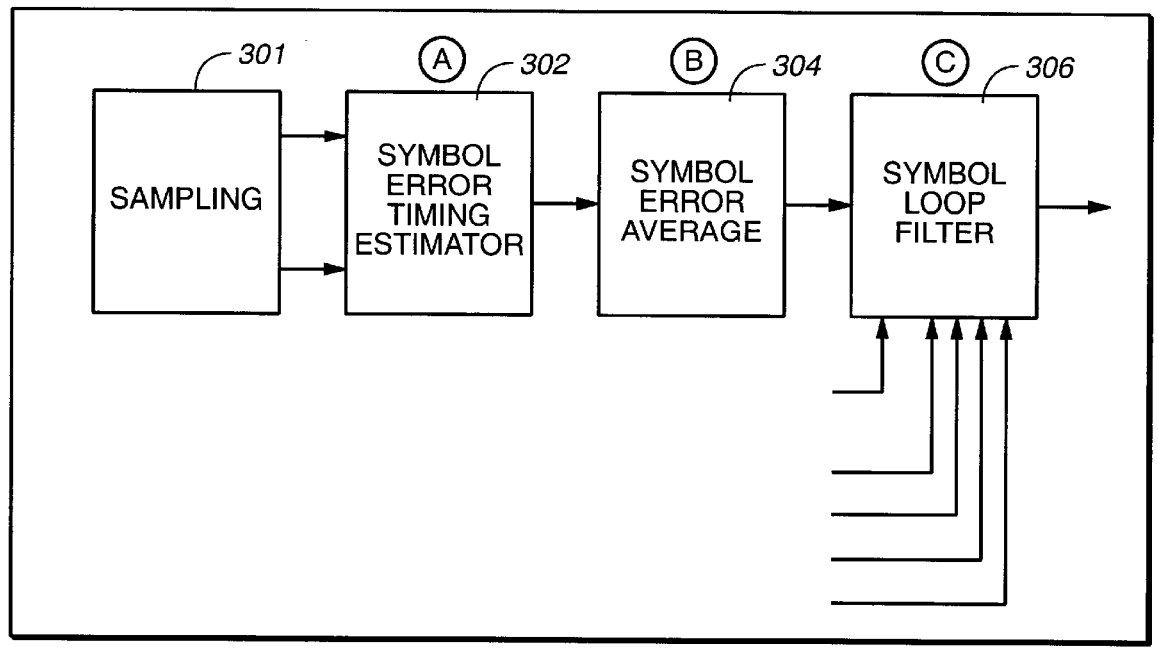
FIG._13
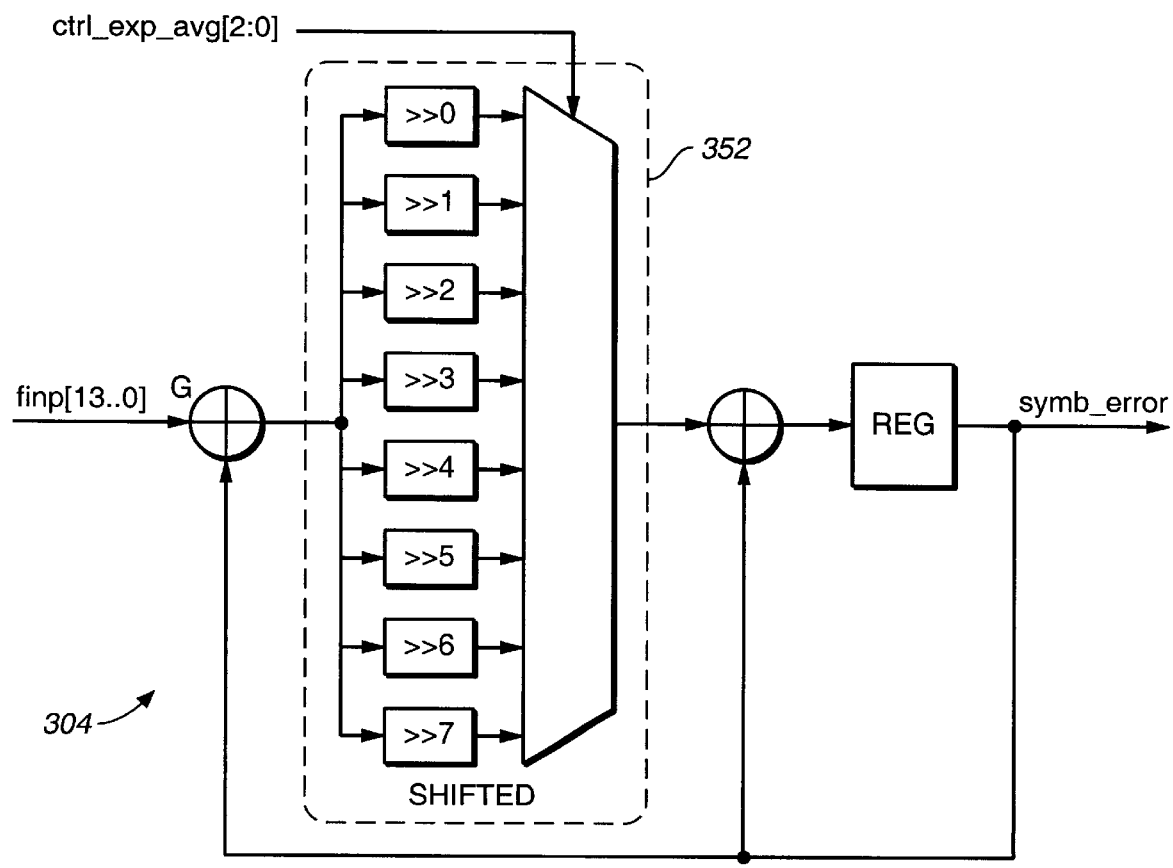
FIG._16

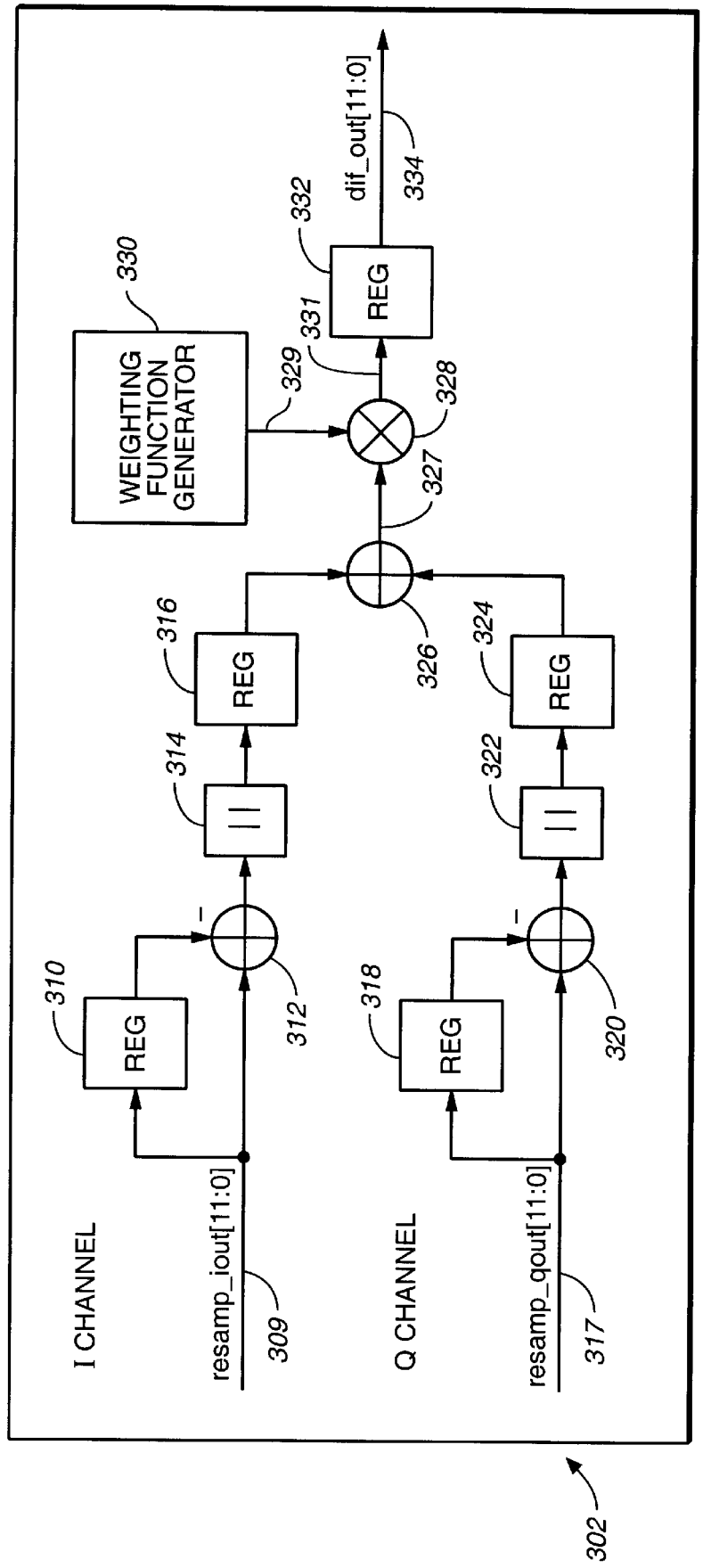
FIG._14

PERFECT SAMPLING
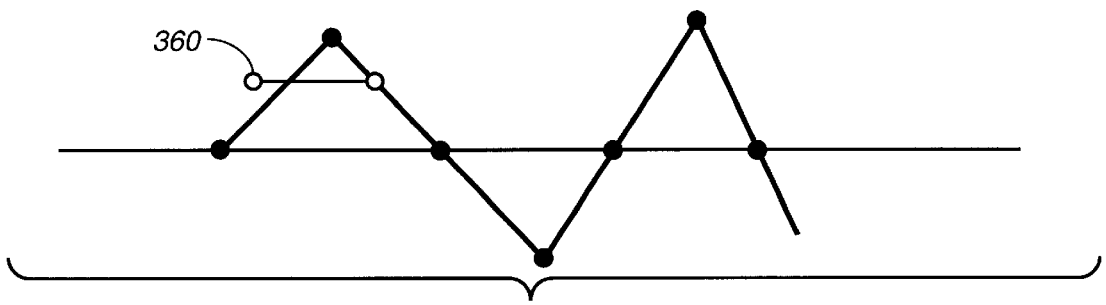
FIG._17A
WORST SAMPLING
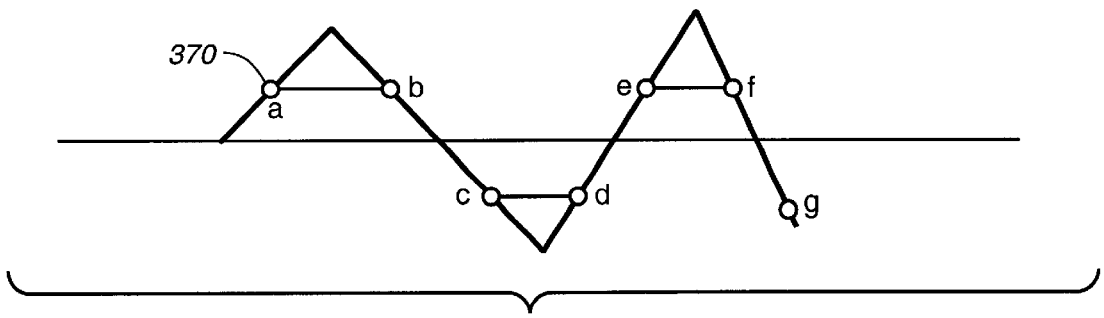
FIG._17B

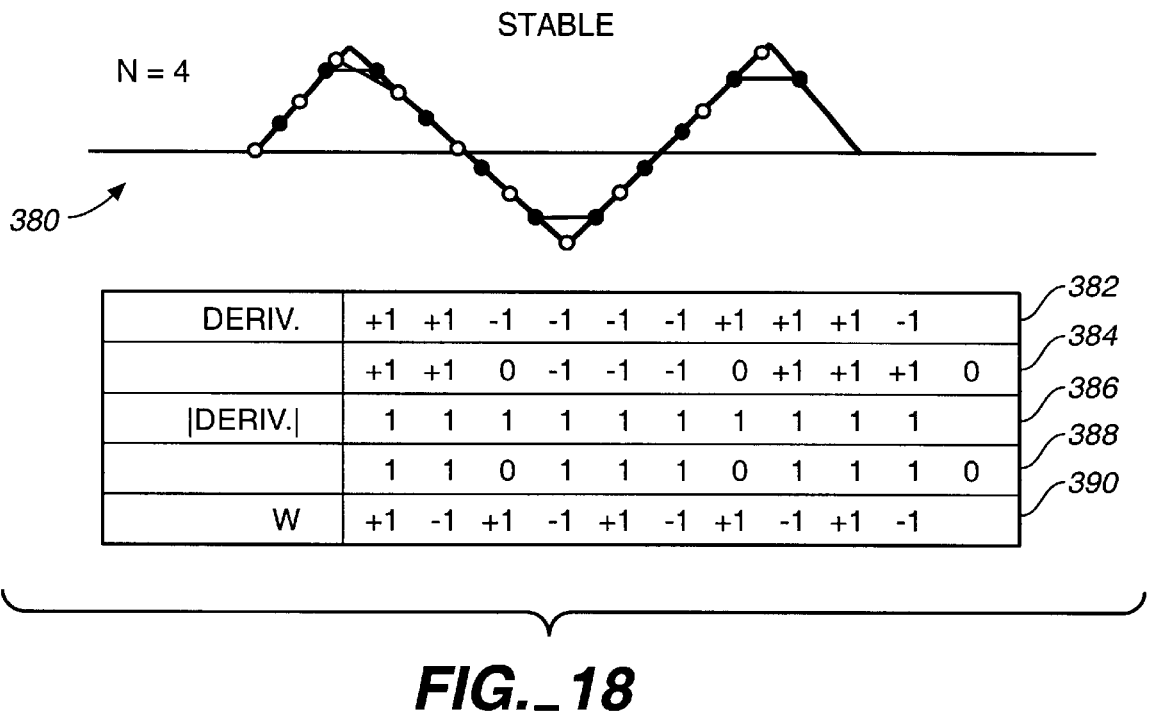
FIG._18
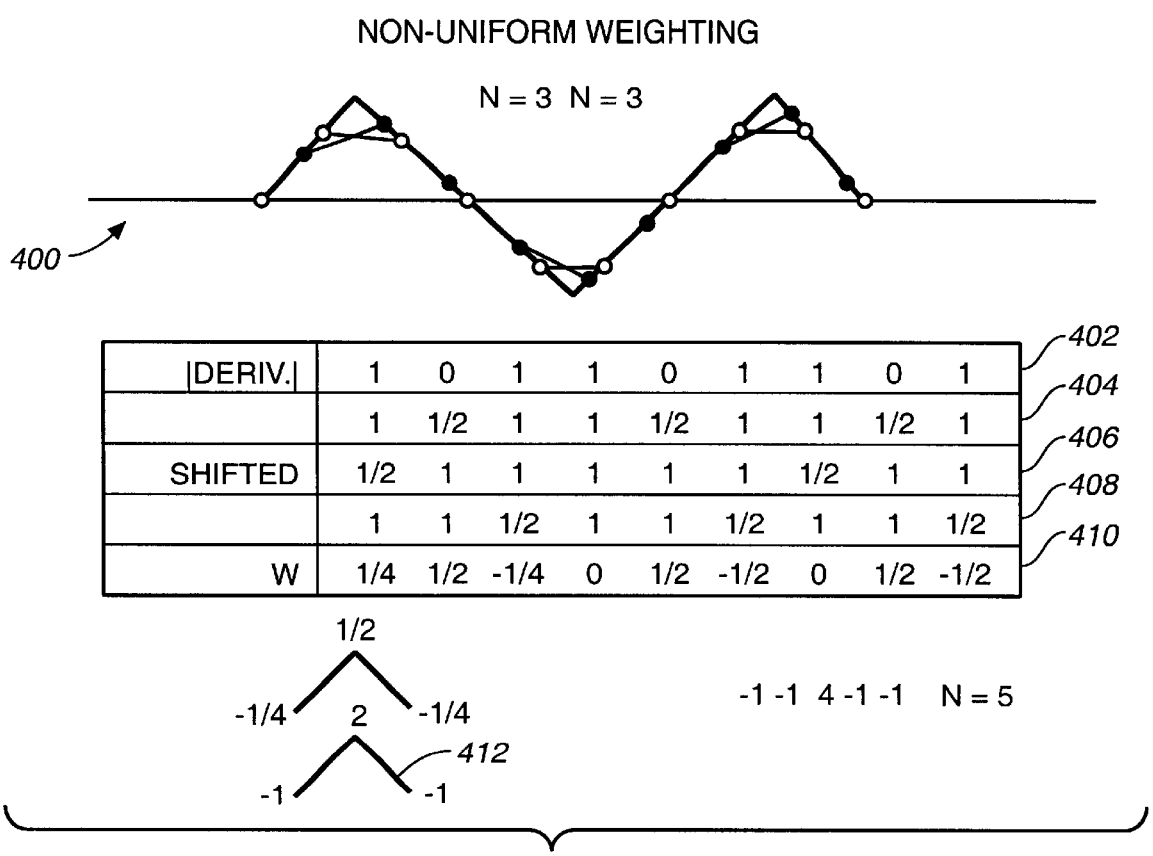
FIG._19

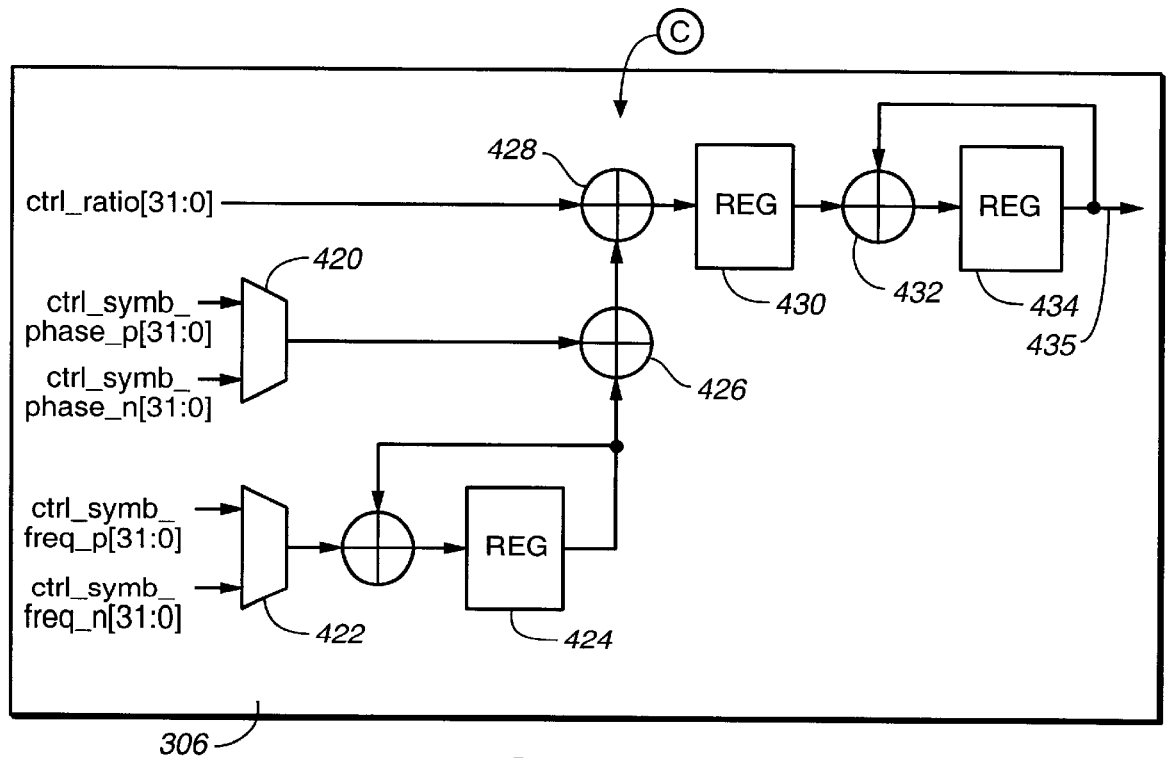
FIG._20
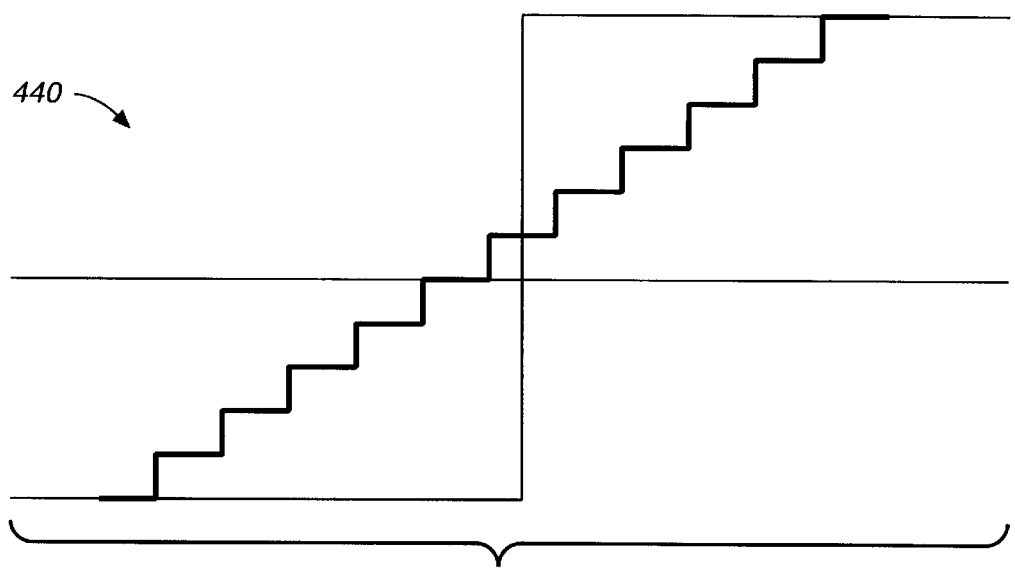
FIG._21

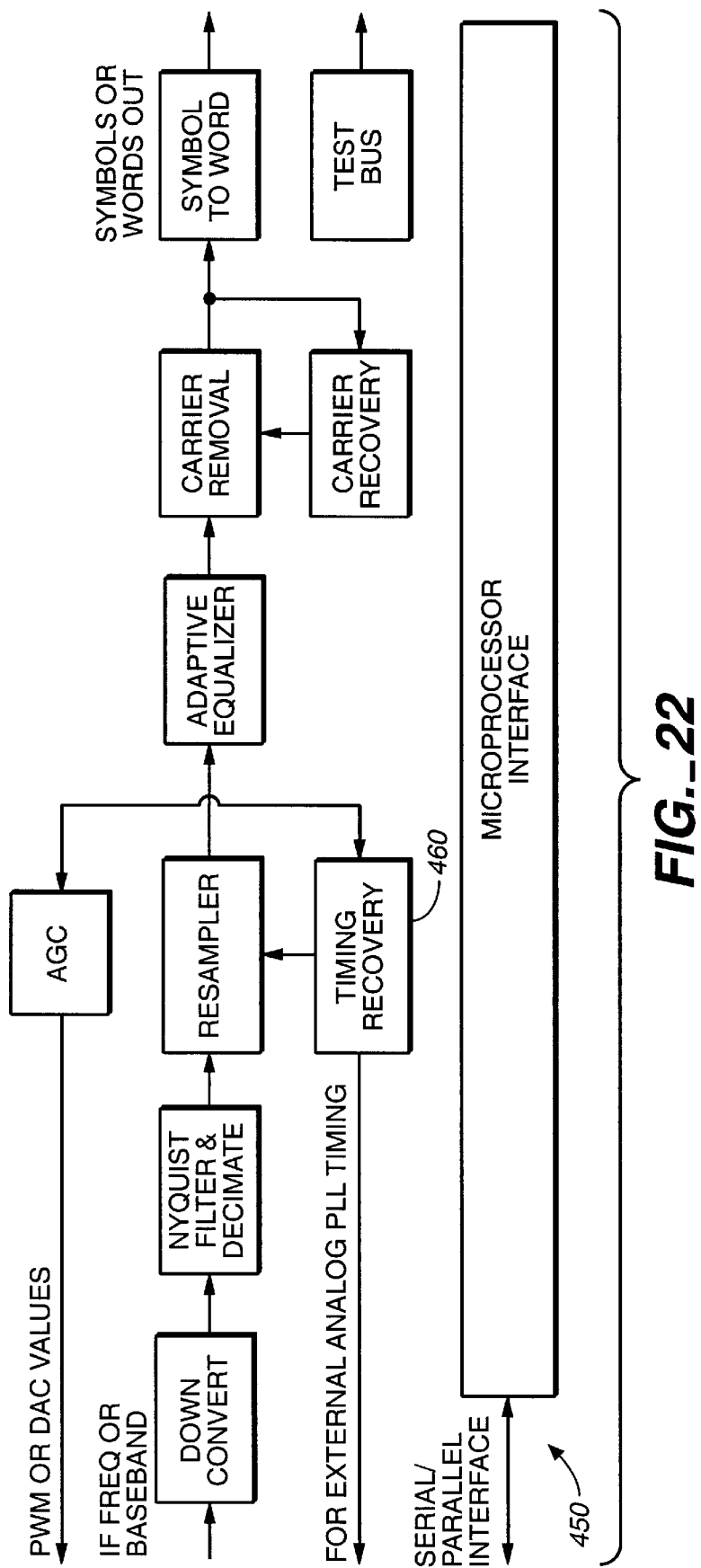

TIMING RECOVERY CIRCUIT IN QAM MODEMS

BACKGROUND OF THE INVENTION

1. Field of the Invention

The present invention relates to timing recovery in a modem receiver and, in particular, to symbol timing recovery for a quadrature amplitude modulation (QAM) modem receiver.

2. Discussion of the Prior Art

The basic function of any communications system is to transmit information over a communication channel from an information source to a destination as fast and as accurately as possible.

There are two general types of information sources. Analog sources, such as a telephone microphone, or an analog cable system, generate a continuous signal. Digital source, such as a digital data processing system, generates a signal that consists of a sequence of pulses.

To permit the transmission of digital pulse streams over an analog channel, it is necessary to utilize the digital data pulses to modulate a carrier waveform that is compatible with the analog transmission channel.

The MOdulator-DEModulator, or MODEM, includes the capability not only to modulate transmitted signals, but also to demodulate received signals to recover the digital data from the modulated analog carrier waveform.

The received signal is typically contaminated by two types of distortion: a noise distortion, and a communication channel distortion.

In a conventional modem, the signal is sampled by an analog to digital conversion circuitry (ADC) that converts the analog front end of the received modulated carrier waveform to a digitized replica.

The timing recovery in a conventional modem is performed by a digital signal processor (DSP) that transforms the digital data from the digitized replica using a recovered timing error signal. For proper timing recovery, the receiver clock should be synchronized to the transmitter clock. More specifically, the sampling clock of the receiver should be frequency and phase synchronized to the symbol clock of the transmitter. This permits the received signal to be sampled at the optimum point in time to reduce the chance of a slicing error associated with decision-directed processing of received symbol values.

Prior art conventional modems use voltage controlled crystal oscillators (VCXOs) to keep the sampling clock signal stable yet controllable over a relatively narrow range so that it could be locked to the transmitter symbol clock.

However, a VCXO is an analog device that is expensive and prone to drift over its lifetime. In addition, it might be necessary to receive signals from different transmitters having different symbol clock frequencies, requiring replacement of the VCXO.

An alternative prior art timing recovery system operates by sampling a received signal at a fixed frequency slightly higher than twice the highest transmitter symbol rate. These samples are then processed by a digital interpolator to generate a sequence of time interpolated samples synchronized to the transmitter symbol rate. These interpolated synchronized samples are supplied to a digital symbol timing error detector. The output of the digital symbol timing error detector is typically supplied to a second order loop filter. A predetermined value, representing a nominal sampling frequency time delay, is added to the output signal of the loop filter. The combination of the predetermined nominal delay and the output signal from the loop filter controls a numerically controlled delay which provides integer and fractional clock delay component signals. The integer clock delay component signal is used to control production of a sampling clock enable signal synchronized to the transmitted symbol rate. This sampling clock enable signal may be further divided in frequency to provide a receiver symbol clock enable signal. The fractional clock delay component signal is applied to a control input of the interpolator so that the sampled signal produced by the interpolator represents the value of the received signal at the desired sampling time.

Such a timing recovery system is suitable when the quadrature phase shift key (QPSK) modulation is used to modulate the carrier.

However, such a timing recovery system is a relatively complex and expensive one when applied to a carrier modulated by a quadrature amplitude modulation (QAM) scheme.

Indeed, the QAM modulation scheme is the independent amplitude modulation of two orthogonal channels using the same carrier frequency. The required tolerances between the channels in a QAM signal with a dense constellation are difficult to meet. Signal distortions errors always present in the orthogonal channels result in crosstalk between channels which is very difficult to remove by further signal processing in an equalizer.

Thus, what is needed is a timing recovery system which can operate on QAM signals having different symbol rates without undue complexity and expense.

SUMMARY OF THE INVENTION

To address the shortcomings of the available art, one aspect of the present invention is directed to a method for generating a correction command for advancing or delaying the sample timing of a modem front end used to recover data from an incoming QAM baseband signal having maximum/minimum.

In one embodiment, the method comprising the following steps: (a) sampling the QAM baseband signal; (b) utilizing a symbol timing recovery logic to develop a local error signal; (c) averaging the local error signal over a predetermined time period; and (d) utilizing the averaged local error signal to make a global decision regarding the sampling point position relative to the baseband signal maximum/minimum.

Based on the global decision, a correction command is issued to the analog front end to either advance or delay the sample timing.

In one embodiment, the step (b) of utilizing the symbol timing recovery logic to develop the local error signal further includes the following steps: (b1) estimating an absolute value of the first derivative of the QAM baseband signal separately for the real and imaginary axis; (b2) adding the estimated absolute values of the real and the imaginary first derivatives of the QAM baseband signal to develop a resulting signal; and (b3) multiplying the resulting signal by a weighting function to develop the local error signal.

In one embodiment, the weighting function further includes a uniform weighting function utilized to develop the local error signal.

In another embodiment, the weighting function further includes a non-uniform weighting function used to develop the local error signal.

In one embodiment, the step (c) of averaging the local error signal over the predetermined time period further includes the steps of: (c1) utilizing an averaging logic to average the local error signal over the predetermined time period; and (c2) operating the averaging logic at at least twice the symbol rate.

In one embodiment, the averaging logic is operated at the rate equal to an even number times the symbol rate.

In another embodiment, the averaging logic is operated at the rate equal to an odd number times the symbol rate.

In one embodiment, an exponential averaging logic is utilized to perform the averaging operation. The exponential averaging logic is configured to assign the most weight to the most recent symbol.

Another aspect of the present invention is directed to a timing recovery circuit in QAM modems.

In one embodiment, the QAM timing recovery circuit comprises: (a) a sampler circuit configured to sample a QAM baseband signal; (b) a symbol timing recovery circuit configured to process the sampled QAM baseband signal and configured to develop a local error signal; (c) a symbol error averaging circuit configured to average the local error signal over a predetermined time period; and (d) a decision making circuit configured to utilize the averaged local error signal to make a global decision regarding the sampling point position relative to the baseband signal maximum/minimum.

BRIEF DESCRIPTION OF THE DRAWINGS

The aforementioned advantages of the present invention as well as additional advantages will be more clearly understood as a result of a detailed description of a preferred and alternative embodiments of the invention when taken in conjunction with the following drawings.

FIG. 1 depicts a basic QAM modem schematic.

FIG. 2 illustrates the action of the ADC that converts an analog signal into its digitized counterpart.

FIG. 3 depicts a 16-QAM square constellation.

FIG. 4 shows typical I and Q components time-domain representation.

FIG. 5A depicts ideal Nyquist filter characteristic.

FIG. 5B illustrates ISI free impulse response for the ideal Nyquist filter characteristic of FIG. 5A.

FIG. 6A shows the frequency response of an infinite impulse response (IIR) filter.

FIG. 6B depicts the frequency response a finite impulse response (FIR) filter.

FIG. 7A shows the transmitted RF spectrum.

FIG. 7B illustrates the received RF spectrum at SNR=10 dB.

FIG. 8 depicts the early-late (E-L) clock recovery schematic.

FIG. 9A illustrates two types of symbol for the sequence { 1, 3, 1} and for the sequence {-1,-3,-1} that produce the same squared waveform for EL clock recovery for QAM.

FIG. 9B shows two types of symbol for the sequence {3, 1, 3} and for the sequence {-3,-1,-3} that produce the same squared waveform for EL clock recovery for QAM.

FIG. 9C illustrates two types of symbol for the sequence {-1, 1, 3} and for the sequence { 1, -1, -3} that produce the same squared waveform for EL clock recovery for QAM.

FIG. 10 plots the prior art modified EL clock recovery system that is based on over sampling.

FIG. 11 illustrates the flow chart of the basic steps of the method of the present invention.

FIG. 12 plots the flow chart of the main steps of the symbol timing recovery algorithm of the present invention.

FIG. 13 depicts a block diagram of a timing recovery circuit in QAM modems of the present invention.

FIG. 14 illustrates a block diagram of a symbol error timing block in QAM modems of the present invention.

FIG. 15 depicts an averaging block of the present invention.

FIG. 16 depicts an averaging logic circuitry including an exponential averaging block.

FIG. 17A illustrates the perfect sampling timing case wherein the averaging logic operates at twice the symbol rate.

FIG. 17B shows the worst case scenario wherein the sampling timing is maximum out of phase, and wherein the averaging logic operates at twice the symbol rate.

FIG. 18 illustrates the case of 4 samples per symbol, wherein the weighting function $\{1, 1, 0, -1, -1, \ldots\}$ assigns equal weights (or zero weight) to different bits, and a stable feedback signal is generated.

FIG. 19 depicts the case of 3 samples per symbol, wherein the weighting function $\{-1, 2, -1, \ldots\}$ assigns unequal weights to different bits in order to generate a stable feedback signal.

FIG. 20 shows the rate lock loop.

FIG. 21 plots the phase diagram of the phase detector comprising the lookup table.

FIG. 22 illustrates the location of the timing recovery block within the QAM modem architecture.

DETAILED DESCRIPTION OF THE PREFERRED AND ALTERNATIVE EMBODIMENTS

As shown in FIG. 1, in a prior art pure digital communication system the modem's input signal is a digital signal stream from a digital source (14) or channel encoder. If the modem's input signal is generated by an analog information source (12), the signal should be first bandlimited to a bandwidth of B in a low pass filter (LPF) block (16), before sampling can take place in an analog to digital converter (ADC) block (18).

According to Nyquist's fundamental theorem, the sampling frequency should be equal to or higher than twice the bandwidth B, that is $f_c \geq 2B$. If this condition is met, the original bandlimited signal can be recovered from its (½B)-spaced sampled representation with the aid of a low-pass filter having a cut-off frequency of B.

For instance, most of the energy of a voice signal is concentrated at frequencies below 4 kHz, and hence speech signals are typically lowpass filtered to 4kHz. As a result, a sampling rate of 8 kHz or higher is required in order to accurately reconstruct such a signal. In practice, most voice communication systems use a sampling rate of 8 kHz.

The analog to digital converter (ADC) (18 of FIG. 1) takes the bandlimited signal and digitizes it by converting the analog level of each sample to a discrete level. For example, in an 8-bit ADC each discrete level is represented by eight binary output bits. This provides a resolution of 256 distinct digital levels.

FIG. 2 illustrates the action of the ADC that converts an analog signal (62) into its digitized counterpart (64) using only a small number of quantized bits.

The key difference between a digital communication system and an analog one is the signal transmission techniques employed. For instance, in an analog radio the signal to be transmitted is modulated directly onto the carrier. But the internal thermal device noise always causes some loss of information. On the other hand, a digital radio system incorporates modulation and signal processing schemes that can provide an error-free digital communication link.

The process of mapping is illustrated by block MAP (20 of FIG. 1). The mapping process that maps the input information bits from the digital source (14) onto the in-phase (I) and quadrature (Q) carriers determines the properties of the modem. The mapping can be represented by the so-called constellation diagram. A constellation is the resulting two-dimensional plot when the amplitudes of the I and Q levels of each of the points which could be transmitted (the constellation points) are drawn in a rectangular coordinate system.

FIG. 3 depicts a 16-QAM square constellation (70), wherein each element (phasor) (72–102) is represented by a four-bit symbol comprising the in-phase bits (i1, i2) and quadrature bits (q1, q2) which are interleaved to yield the sequence (i1, q1, i2, q2). To maximize the average energy of the phasors, quaternary quadrature components I and Q are Gray encoded by assigning the bits 01, 00, 10, and 11 to the levels 3d, d, −d, and −3d, respectively.

For the geometry of FIG. 3, the average transmitted energy is as follows:

$$E_0=(2d^2+2\times10d^2+18d^2)/4=10\times d^2. \tag{1}$$

For any other phasor arrangement the average energy will be less and the signal to noise ratio (SNR) required to achieve the same bit error rate (BER) will be higher.

FIG. 4 is a plot of a typical quaternary I component sequence generated by mapping the input data using the constellation diagram (70) of FIG. 3. Due to the instantaneous transitions in the time domain the I-sequence (110) has an infinite bandwidth and would require an infinite channel bandwidth for its transmission. The same is true for the Q-component (not shown). Thus, the I and Q signals should be bandlimited before transmission in order to contain the spectrum within a limited band and to minimize interference with other users or systems sharing the spectrum.

An ideal linear-phase low pass filter (16 of FIG. 5A) with a cut-off Nyquist frequency of $f_N=f_S/2$, wherein $f_S=1/T$ is the signaling frequence, and wherein T is the signaling interval duration, would retain all the information conveyed by the quadrature components I and Q within a compact frequence band. Due to the linear phase response of the filter (16 of FIG. 5A) all frequency components would exhibit the same group delay. Because such a filter has a sinc function shaped impulse response with equi-distant zero-crossings at the sampling instants, it does not result in inter-symbol-interference (ISI). The ideal transfer function, or Nyquist characteristic, shown as curve (120) in FIG. 5A, has an impulse response characteristic (130) shown in FIG. 5B.

All practical lowpass (LP) filters, like an infinite impulse response (IIR) filter, shown as (140) in FIG. 6A, or a finite impulse response (FIR) filter, shown as (150) in FIG. 6B, have impulse responses with non-zero values at the equi-spaced sampling instants, introduce ISI, and degrade the BER performance. To minimize the distortions, and to maximize the SNR, the so-called matched filtering can be used, wherein the Nyquist characteristic is divided between two identical filters, each characterized by the square root of the Nyquist shape, as suggested by the filters √N (22 and 24) of FIG. 1.

Once the analog I and Q signals have been generated and filtered, they are modulated by an I-Q modulator (16 and 28) as shown in FIG. 1. The I channel is modulated, or mixed, with an intermediate frequency (IF) signal generated by block (32), wherein the Q channel is modulated by the IF signal that is 90 degrees out of phase. This process allows both I and Q signals to be transmitted over a single channel within the same bandwidth using quadrature carriers. The I and Q signals are combined in block (34).

Finally, the combined signal is modulated by a radio frequency in the RF mixer (36), so that the resulting signal has a carrier frequency suitable for the transmission over the channel (38).

The RF demodulator (58 of FIG. 1) mixes the received signal down to the IF for the I-Q demodulator (54 of FIG. 1). As shown in FIG. 7B, the recovered IF spectrum (184 and 186) is similar to the transmitted one (164 and 166 of FIG. 7A), but with the additive noise floor (182).

The I-Q demodulation takes place in the reverse order to the I-Q modulation process, as shown in FIG. 1. The signal is split into two paths, with each path being mixed down with IF's that are 90 degrees apart. The recovered I component should be near identical to that transmitted, with the only difference being caused by noise.

Once the analog I and Q components have been recovered, they should be digitized. This is done by the bit detector in the DEMAP block (48 of FIG. 1). The bit detector determines the most likely bit (MLB) transmitted by sampling the I and Q signals at the correct sampling instants and compares them to the legitimate I and Q values of −3d, −d, d, 3d in the case of a square QAM constellation (70 of FIG. 3). From each I and Q decision two bits are derived, leading to a 4-bit 16-QAM symbol. The four recovered bits are then passed to the DAC (46 of FIG. 1).

If the channel's SNR is high enough, the reconstructed digital signal is identical to the original input signal. Provided the DAC (46) operates at the same frequency and with the same number of bits as the input ADC (18), then the analog output signal after lowpass filtering with a cut-off frequency of B in block LPF (44), is a close replica of the input signal.

The right time to sample is a function of the clock frequency at the transmitter. The data clock should be regenerated upon recovery of the carrier. Any error in the clock recovery will increase the BER.

Both clock and carrier recovery systems attempt to derive information about timing from the received signal. While carrier recovery is only necessary in a coherent demodulation system, clock recovery is required in all schemes, and accurate clock recovery is essential for reliable data transmission.

Clock recovery attempts to synchronize the receiver clock with the baseband symbol rate transmitter clock, wherein carrier recovery endeavors to align the receiver local oscillator with the transmitted carrier frequency.

Basic clock recovery systems which can be used successfully in conjunction with QAM includes times-two, early-late, zero crossing and synchronized clock recovery systems.

The basic assumptions made by the early-late method are that the peaks in the incoming waveform are at the correct sampling points and that these peaks are symmetrical.

The early-late (EL) scheme (190) shown in FIG. 8 firstly squares the incoming signal in order to render all peaks positive, and then takes two samples of the received waveform, both equi-spaced around the predicted sampling point. If the predicted sampling instant is aligned with the correct sample point, and the assumptions made above are correct, then the sample taken just prior to the sample point—the early sample—will be identical to the sample taken just after the sampling instant-the late sample. If the early sample is larger than the late sample, this indicates that the recovered clock is sampling too late, and if the early sample is smaller than the late sample this indicates that the recovered clock is sampling too early. The difference of each pair of samples is low-passed in the LPF block (200) to reduce the effect of random noise on the system. This filtered difference signal adjusts the frequency of a voltage controlled oscillator VCO (198) in order to delay or advance the arrival of the next clock impulse, as required by the early and late samples.

The early-late (EL) clock recovery works well in conjunction with binary modulation schemes which have peaks in most of the symbol periods, but less satisfactory with multilevel schemes because there are fewer distinctive peaks.

Indeed, the major problem with EL clock recovery for QAM transmissions is that not all QAM sequences result in time-domain waveform peaks occurring every sampling period. An even more detrimental effect is that half the peaks are of the wrong polarity for the clock recovery technique.

The latter problem is illustrated in FIGS. (9A–9C), wherein two types of symbol produce the same squared waveform for EL clock recovery for QAM. The polarity of the early signal minus the late signal is considered for three different received 16-QAM sequences, assuming in all cases that the sampling point is too early. Due to the squaring operation identical waveform segments having opposite polarity yield identical PLL control sequences. The early and late sampling points are shown by dashed vertical lines on the squared signal. The chosen sampling point is assumed to lie in the center of theses lines, whereas the correct sampling instant is seen to be nearer to the late sample, or to the rightmost dashed line. When the sampling point is early, the early signal minus the late signal should be negative for conventional early-late schemes to function correctly, and this is represented in FIG. 9A by curve (213) as "E-L negative".

For the QAM sequence {1,3,1} indicated by the notation (212), the first number refers to the modulation level on the I channel transmitted in the symbol period prior to the one in which peak detection is to be performed. The second number in the sequence refers to the modulation level in the symbol period in which peak detection is attempted, while the third number refers to the modulation level in the symbol period after the one in which peak detection is attempted. The sequence { −1,−3,−1} indicated by the notation (214), leads to an identical waveform (213) after squaring, wherein the squaring is an integral part of the EL process. Both of these sequences result in correct E-L polarity.

The received sequences {3,1,3} and {−3, −1, −3} shown in FIG. 9B, lead to an identical waveform (217) after squaring, wherein the E-L polarity is of the opposite polarity to that in FIG. 9A.

The problematic sequences such as {−1, 1, 3} and {1, −1, −3} shown in FIG. 9C, also lead to an identical waveform (221) after squaring.

The consequence is that the E-L difference signal, which should be negative for all the waveforms in FIGS. (9A–9C), is correct for only a fraction of the transmitted symbols. These problems render the conventional EL clock recovery system for QAM unreliable.

The basis of modified EL clock recovery for QAM is to search the current symbol for a peak, and if one is found to assess its suitability for clock recovery. If a suitable peak is found the update information is sent to the phase lock loop (PLL).

The prior art modified EL clock recovery system (240) is based on over sampling, as shown in FIG. 10. The EL clock recovery system (240) waits until all n of the over sampled observations for a symbol period have been made (242), where the n observations are equi-spaced around the current sampling point. The maximum and the minimum samples during the observation period are then identified. If the maximum is at either end of the sampling period, the search for a positive pulse is discontinued since this implies that there cannot be a valid positive peak in the current sampling period. The same applies if the minimum is at either end of the sampling period.

If there is a valid maximum (254), sample gradients on both sides of the peak are calculated and the peak is rated depending on these gradients (258). A similar rating is calculated for the negative pulse (260) if there is still a valid minimum (256). If the score for a positive peak exceeds the score for a negative peak, then the positive peak is deemed more dominant (264) and the negative peak is discarded. If a valid peak is identified, the difference between the current sampling time and the peak just identified is used to update the variable internal clock, normally a phase locked loop (PLL) (268). Otherwise, the PLL is allowed to continue running at its current level.

The above-given prior art introduction to the QAM modems can be found in "Modem Quadrature Amplitude Modulation", by W. T. Webb and L. Hanzo, published by Pentech Press Limited in 1994, in Great Britain.

The present invention discloses a different and more advantageous method for timing clock recovery for QAM.

In one embodiment, the flow chart (280 of FIG. 11) illustrates the basic steps of the method of the present invention. After sampling the QAM baseband signal (step 282), a symbol timing recovery logic is utilized to develop a local error signal (step 284). The local error signal is averaged over a predetermined time period (step 286) and is used to make a global decision regarding the sampling point position relative to the baseband signal maximum/minimum (step 288). Based on the global decision, a correction command is issued (not shown) to the analog front end to either advance or delay the sample timing.

The essence of the method of the symbol timing recovery of the present intention is a symbol timing recovery algorithm.

In one embodiment, the main steps of the symbol timing recovery algorithm of the present invention are shown in the flow chart (290) of FIG. 12.

After estimating an absolute value of the first derivative of the QAM baseband signal separately for the real and imaginary axis (step 292), the estimated absolute values of the real and the imaginary first derivatives of the QAM baseband signal are added (step 294) to develop a resulting signal. Finally (step 296), the resulting signal is multiplied by a weighting function to develop the local error signal.

In one embodiment, FIG. 13 depicts a block diagram (300) of a symbol timing recovery circuit in QAM modems of the present invention. A sampler circuit (301) is configured to sample a QAM baseband signal by using two low pass filters √N having the square root of the Nyquist shape (not shown). As was explained above, the usage of two √N filters allows the timing recovery circuit to maximize the SNR of the signal coming out from the communication channel.

A symbol error timing block (302 of FIG. 13) configured to process the sampled QAM baseband signal and configured to develop a local error signal is shown in more details in FIG. 14.

The two low pass filters √N output a symbol transmitted by the communication channel as two half symbols for the I channel (309) and for the Q channel (317) respectively.

In register (310) one/half of the incoming from the transmission channel symbol is stored (at t=0). In the substracter (312) the first derivative or slope of the incoming symbol in the I channel is estimated by subtracting the stored ½ symbol (t=0) from the current ½ symbol (t=1):

$$slope_I = \text{½ symbol } (t=1) - \text{½ symbol } (t=0). \quad (2)$$

In the block (314) the absolute value of the slope, in the I channel is estimated:

$$\text{Absolute\_value } \{slope_I(t=1 \rightarrow t=0)\} = [\text{½ symbol } (t=1) - \text{½ symbol } (t=0)] \times sign [\text{½ symbol } (t=1) - \text{½ symbol } (t=0)]. \quad (3)$$

Similarly, in register (318) one/half of the incoming from the transmission channel symbol is stored (at t=0). In the substracter (320) the first derivative or slope of the incoming symbol in the Q channel is estimated by subtracting the stored ½ symbol (t=0) from the current ½ symbol (t=1):

$$slope_Q = \text{½ symbol } (t=1) - \text{½ symbol } (t=0). \quad (4)$$

In the block (322) the absolute value of the $slope_Q$ is estimated:

$$\text{Absolute\_value } \{slope_Q(t=1 \rightarrow t=0)\} = [\text{½ symbol } (t=1) - \text{½ symbol } (t=0)] \times sign [\text{½ symbol } (t=1) - \text{½ symbol } (t=0)]. \quad (5)$$

In the adder block (326) the Absolute_value {$slope_I$(t=1→t=0)} and the Absolute_value {$slope_Q$(t=1→t=0)} are added to obtain the resulting signal (327). The resulting signal utilizes both parts of the transmitted symbol. Therefore, the resulting signal retains the full energy of the transmitted symbol which increases the SNR of the QAM modem.

In the multiplier block (328) the resulting signal (327) is multiplied by the weighting function (329) generated by the weighting function generator (330) to develop a local error signal (331).

This operation replaces the decision logic employed in the prior art algorithm (240 of FIG. 10).

In one embodiment, the weighting function comprises a uniform weighting function to develop the local error signal, wherein the uniform weighting function assigns equal weights to different symbols.

In one embodiment, a uniform weighting function comprises the following function comprising the set of alternating values:

$$\text{Uniform\_Weighting\_function}_0 = \{+1, -1, +1, -1 \ldots \}. \quad (6)$$

In another embodiment, the weighting function comprises a non-uniform weighting function utilized to develop the local error signal, wherein the non-uniform weighting function assigns unequal weights to different symbols.

In one embodiment, a non-uniform weighting function comprises the following function comprising the set of alternating values:

$$\text{Non\_uniform\_Weighting\_function}_1 = \{-1, 2, -1, -1, 2, -1, \ldots \}. \quad (7)$$

The local error signal (331) is accumulated in the register block (333). The register block (333) updates the local pre-averaged error signal per symbol. The updated once per symbol local error signal (334) is input into the symbol error averaging circuit (304 of FIG. 13).

FIG. 15 depicts a symbol averaging block (304 of FIG. 13) of the present invention in more details. The symbol averaging block operates on successive error outputs from the symbol error timing block (302 of FIG. 14). As was mentioned above, the error input (334) is updated once per symbol.

The symbol error averaging circuit (304 of FIG. 15) is configured to average the local error signal over a predetermined time period.

In the preferred embodiment, the relatively large amount of averaging is performed (about 100) before the global decision regarding the position of the sampling point relative to the baseband signal maximum/minimum is made.

In one embodiment, the symbol error averaging circuit further comprises a finite impulse response (FIR) low pass filter. In another embodiment, the symbol error averaging circuit further comprises an infinite impulse response (IIR) low pass filter. See the relevant discussion above.

According to the Nyquist theorem, the averaging logic block (342 of FIG. 15) is configured to operate at at least twice the symbol rate.

In one embodiment, the averaging logic block (342 of FIG. 15) is configured to operate at the rate equal to an even number times the symbol rate.

In another embodiment, the averaging logic block (342 of FIG. 15) is configured to operate at the rate equal to an odd number times the symbol rate.

In the preferred embodiment, the averaging block (342 of FIG. 15) comprises an exponential averaging logic that assigns the most weight to the most recent symbol.

FIG. 16 depicts an averaging logic circuitry (304 of FIG. 13) including an exponential averaging block (352).

In one embodiment, the exponential averaging logic (352) operates at twice the symbol rate. In this embodiment, the exponential averager (352) output is updated twice when the clock count=3 or the clock count=7 during the symbol period.

In this embodiment, the symbol error timing block (302 of FIG. 13) utilizes the uniform weighting function Uniform_Weighting_function$_0$={+1, −1, +1, −1 . . . } to yield the best performance.

FIGS. 17A and 17B illustrate the embodiment wherein the exponential averaging logic (352) operates at twice the symbol rate.

FIG. 17A illustrates the perfect sampling timing case. If this is the case, before averaging the slope of curve (360) is given by the numbers in the table (362). After the weighting function {+1, −1, +1, −1 . . . } (table 364) is applied, and absolute value is taken (table 366), the average error feedback signal is calculated to be equal to zero.

FIG. 17B illustrates the worst case scenario wherein the sampling timing is maximum out of phase. If this is the case, before averaging the slope of curve (360) is given by the numbers in the table (372). After the weighting function {+1, −1, +1, −1 . . . } (table 367) is applied, and absolute value is taken (table 376), the average error feedback signal is calculated to be equal to its maximum value.

In one embodiment, the exponential averaging logic block (352 of FIG. 16) is configured to operate at the rate equal to an even number times the symbol rate. If this is the case, the employed weighting function should be a uniform one. This is illustrated in FIG. 18, for the case of 4 bits per symbol, wherein the uniform weighting function { 1, 1, 0, −1, −1, . . . } assigns equal weights (or zero weight) to different bits, and a stable feedback signal is generated.

In another embodiment, the exponential averaging logic block (352 of FIG. 16) is configured to operate at the rate equal to an odd number times the symbol rate. If this is the case, the employed weighting function should be a non-uniform one. This is illustrated in FIG. 19 for the case of 3 bits per symbol, wherein the non-uniform weighting function {−1, 2, −1, . . . } assigns unequal weights to different bits in order to generate a stable feedback signal.

As depicted in FIG. 20, a loop filter (306 of FIG. 13) utilizes the averaged local error signal to make a global decision regarding the sampling point position relative to the baseband signal maximum/minimum.

The loop filter (306 of FIG. 13 and FIG. 20) utilizes the phase error detector (348 of FIG. 15) to generate a feedback signal (350 of FIG. 15, or 435 of FIG. 20).

The most significant bit (MSB) of the feedback signal generated by the phase detector is used to detect the sign of the feedback signal in order to make a determination whether to advance or delay the sampling point.

The more precise information about the feedback signal may be obtained if other bits of the feedback signal are utilized.

In one embodiment, a phase detector includes a lookup table. If this is the case, the lookup table can be designed in such a way that the phase detector can detect the phase of the averaged error signal with a predetermined resolution, as illustrated in FIG. 21.

In one embodiment, the lookup table further comprises a RAM circuit. In another embodiment, the lookup table further comprises a ROM circuit.

FIG. 22 illustrates the location of the timing recovery block (460) of the present invention within the QAM modem (450) architecture.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A method for generating a correction command for advancing or delaying the sample timing of a modem front end used to recover data from an incoming QAM baseband signal having maximum/minimum, said method comprising the steps of:

(A) sampling said QAM baseband signal;

(B) estimating an absolute value of a derivative of said QAM baseband signal separately for a real and an imaginary axis;

(C) adding said estimated absolute values of said real and said imaginary derivatives of said QAM baseband signal to develop a resulting signal;

(D) multiplying said resulting signal by a uniform weighting function to develop said local error signal;

(E) averaging said local error signal over a predetermined time period;

and (F) utilizing said averaged local error signal to make a global decision regarding the sampling point position relative to said baseband signal maximum/minimum.

2. A method for generating a correction command for advancing or delaying the sample timing of a modem front end used to recover data from an incoming QAM baseband signal having maximum/minimum, said method comprising the steps of:

(A) sampling said QAM baseband signal;

(B) utilizing a symbol timing recovery logic to develop a local error signal;

(C) utilizing an averaging logic to average said local error signal over said predetermined time period;

(D) operating said averaging logic at at least twice the symbol rate;

and (E) utilizing said averaged local error signal to make a global decision regarding the sampling point position relative to said baseband signal maximum/minimum.

3. The method of claim 2, wherein said step of operating said averaging logic further includes the step of:

operating said averaging logic at the rate equal to an even number times the symbol rate.

4. The method of claim 2, wherein said step of operating said averaging logic further includes the step of:

operating said averaging logic at the rate equal to an odd number times the symbol rate.

5. A method for generating a correction command for advancing or delaying the sample timing of a modem front end used to recover data from an incoming QAM baseband signal having maximum/minimum, said method comprising the steps of:

(A) sampling said QAM baseband signal;

(B) utilizing a symbol timing recovery logic to develop a local error signal;

(C) utilizing an exponential averaging logic to assign the most weight to the most recent symbol;

and (D) utilizing said averaged local error signal to make a global decision regarding the sampling point position relative to said baseband signal maximum/minimum.

6. The method of claim 5, wherein said step of utilizing said exponential averaging logic further includes the step of:

operating said exponential logic at twice the symbol rate.

7. A timing recovery circuit in QAM modems comprising:

a sampler circuit configured to sample a QAM baseband signal;

a symbol timing recovery circuit coupled to said sampler, wherein said symbol timing recovery circuit is configured to process said sampled QAM baseband signal and is configured to develop a local error signal;

an exponential averaging circuit coupled to said symbol timing recovery circuit, wherein said exponential averaging circuit is configured to assign the most weight to the most recent symbol in order to average said local error signal over a predetermined time period;

and a decision making circuit coupled to said symbol averaging circuit, wherein said decision making circuit is configured to utilize said averaged local error signal to make a global decision regarding the sampling point position relative to said baseband signal maximum/minimum.

8. A timing recovery circuit in QAM modems comprising:

a sampler circuit configured to sample a QAM baseband signal;

a symbol timing recovery circuit coupled to said sampler, wherein said symbol timing recovery circuit is configured to process said sampled QAM baseband signal and is configured to develop a local error signal;

a finite impulse response (FIR) low pass filter coupled to said symbol timing recovery circuit, wherein said finite impulse response (FIR) low pass filter is configured to average said local error signal over a predetermined time period;

and a decision making circuit coupled to said symbol averaging circuit, wherein said decision making circuit is configured to utilize said averaged local error signal to make a global decision regarding the sampling point position relative to said baseband signal maximum/minimum.

9. A timing recovery circuit in QAM modems comprising:

a sampler circuit configured to sample a QAM baseband signal;

a symbol timing recovery circuit coupled to said sampler, wherein said symbol timing recovery circuit is configured to process said sampled QAM baseband signal and is configured to develop a local error signal;

a sliding window filter coupled to said symbol timing recovery circuit, wherein said sliding window filter is configured to average said local error signal over a predetermined time period;

and a decision making circuit coupled to said symbol averaging circuit, wherein said decision making circuit is configured to utilize said averaged local error signal to make a global decision regarding the sampling point position relative to said baseband signal maximum/minimum.

10. A timing recovery circuit in QAM modems comprising:

a sampler circuit configured to sample a QAM baseband signal;

a symbol timing recovery circuit coupled to said sampler, wherein said symbol timing recovery circuit is configured to process said sampled QAM baseband signal and is configured to develop a local error signal;

an auto regressive moving averaging (ARMA) circuit;

a sliding window filter coupled to said symbol timing recovery circuit, wherein said auto regressive moving averaging (ARMA) circuit is configured to average said local error signal over a predetermined time period;

and a decision making circuit coupled to said symbol averaging circuit, wherein said decision making circuit is configured to utilize said averaged local error signal to make a global decision regarding the sampling point position relative to said baseband signal maximum/minimum.

11. A timing recovery circuit in QAM modems comprising:

a means for sampling configured to sample a QAM baseband signal;

a means for symbol timing recovery configured to process said sampled QAM baseband signal and configured to develop a local error signal;

a means for an exponential averaging configured to assign the most weight to the most recent symbol in order to average said local error signal over a predetermined time period;

and a means for decision making configured to utilize said averaged local error signal to make a global decision regarding the sampling point position relative to said baseband signal maximum/minimum.

* * * * *